United States Patent [19]

Lunden

[11] 3,737,053
[45] June 5, 1973

[54] LUMBER STACKING APPARATUS
[75] Inventor: Sidney L. Lunden, Spokane, Wash.
[73] Assignee: Moore-Iem, Inc., Spokane, Wash.
[22] Filed: Jan. 3, 1972
[21] Appl. No.: 214,725

[52] U.S. Cl. .................................214/6 DK, 214/6 G
[51] Int. Cl. .................................B65g 57/26
[58] Field of Search ...................214/6 DK, 6 G, 6 P, 214/6 H

[56] References Cited

UNITED STATES PATENTS

| | | | |
|---|---|---|---|
| 2,915,202 | 12/1959 | Aitken | 214/6 DK |
| 3,338,427 | 8/1967 | Thedick | 214/6 DK |
| 3,338,431 | 8/1967 | Thedick | 214/6 DK |

*Primary Examiner*—Robert J. Spar
*Attorney*—Greek Wells, Richard J. St. John and David P. Roberts

[57] ABSTRACT

A lumber stacking apparatus is described for successively depositing layers of boards one on top of another to form a stack in which each board in a layer is horizontally spaced to enable the boards to be efficiently dried in a subsequent drying operation. The apparatus has a forked layer support means with projecting arms that receive and successively transport the layers over a stacking station and in front of a stripping means. The arms are lowered over the stack and then pulled back past the stripping means to strip the layer from the arms and onto the stack. The stripping means has an abutment surface that is inclined to shift the layer sideways as the arms are pulled back to space the boards as they are dropped from the arms.

8 Claims, 11 Drawing Figures

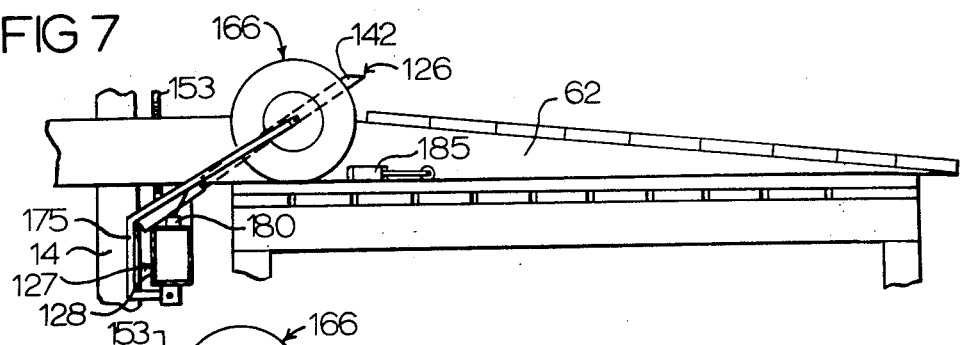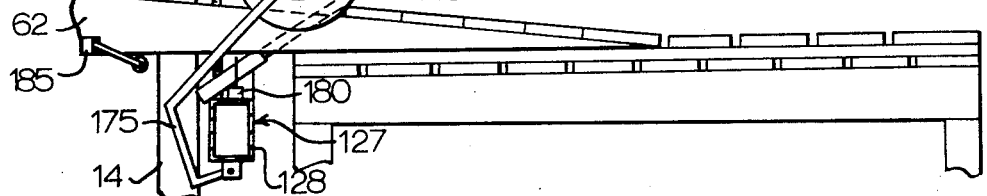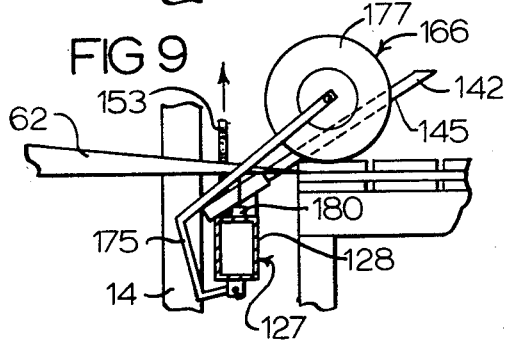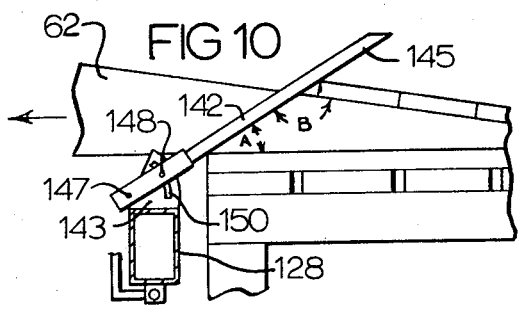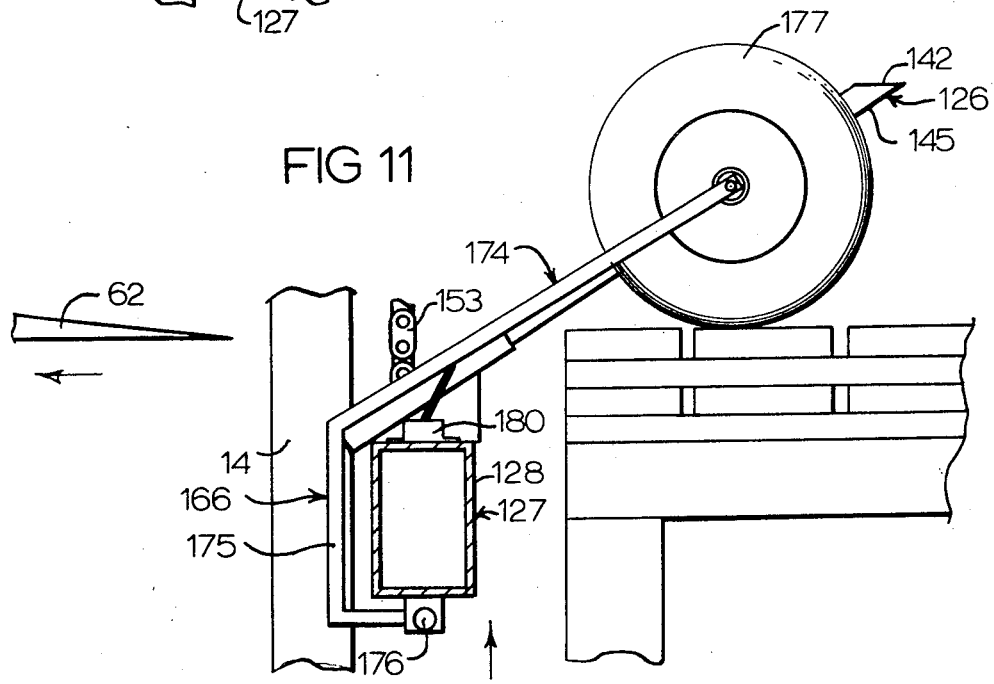

LUMBER STACKING APPARATUS

BACKGROUND OF THE INVENTION

This invention relates to lumber stacking apparatus and more particularly to lumber stacking apparatus capable of horizontally spacing the boards as the boards are being stacked.

It is highly advantageous to space the boards both vertically and horizontally in a stack to allow the boards to dry effectively. Generally stickers are placed transversely between each layer in a stack to separate the boards vertically. However, it has been very difficult to separate the boards horizontally. It has been very difficult to provide a mechanism for separating the boards as the boards are being placed on the stack to provide horizontal spacing. During most stacking operations a layer of boards is moved by an arm arrangement immediately over the stack and then withdrawn to one side stripping the boards off against a stripping abutment. To accomplish the stripping, the boards must necessarily be in abutting engagement with each other on the arms. In an attempt to overcome this, complicated and expensive drive mechanisms have been mounted on the arms for moving the boards off the end of the arms at a rate slightly slower than the arms are being retracted.

One of the principal objects of this invention is to provide a lumber stacking apparatus having a very simple mechanism for stripping boards off an arm structure with the boards being deposited upon the stack at spaced intervals.

An additional object of this invention is to provide a lumber stacking apparatus that has a stripping means that is adjustable, enabling the spacing between the boards to be varied as desired.

A further object of this invention is to provide a lumber stacking apparatus having means for depositing the boards on a stack in a horizontally spaced arrangement with very little modification to existing stackers.

An additional object of this invention is to provide a lumber stacking apparatus that is relatively inexpensive to construct and very easy to maintain.

A further object of this invention is to provide a lumber stacking apparatus capable of horizontally spacing the boards as the boards are deposited upon the stack that is considerably less expensive than stacking equipment presently available.

These and other objects and advantages of this invention will become apparent upon reading of the following detailed description of a preferred embodiment.

BRIEF DESCRIPTION OF THE DRAWINGS

A preferred embodiment of this invention is illustrated in the accompanying drawings, in which:

FIGS. 7–9 are fragmentary illustration views showing the carriage being sequentially retracted to pull an arm structure back past an abutment surface on a stripping mechanism to strip the boards off the forked layer support means to provide horizontal spacing between the individual boards;

FIG. 10 is an isolated fragmentary side view of a stripping member illustrating its angular relation to the top surface of the forked layer support means; and FIG. 11 is an isolated fragmentary view of the stripping mechanism and means for sensing the height of the stack to raise the stripping mechanism after each layer is placed on the stack.

DETAILED DESCRIPTION OF A PREFERRED EMBODIMENT

Figure 1:
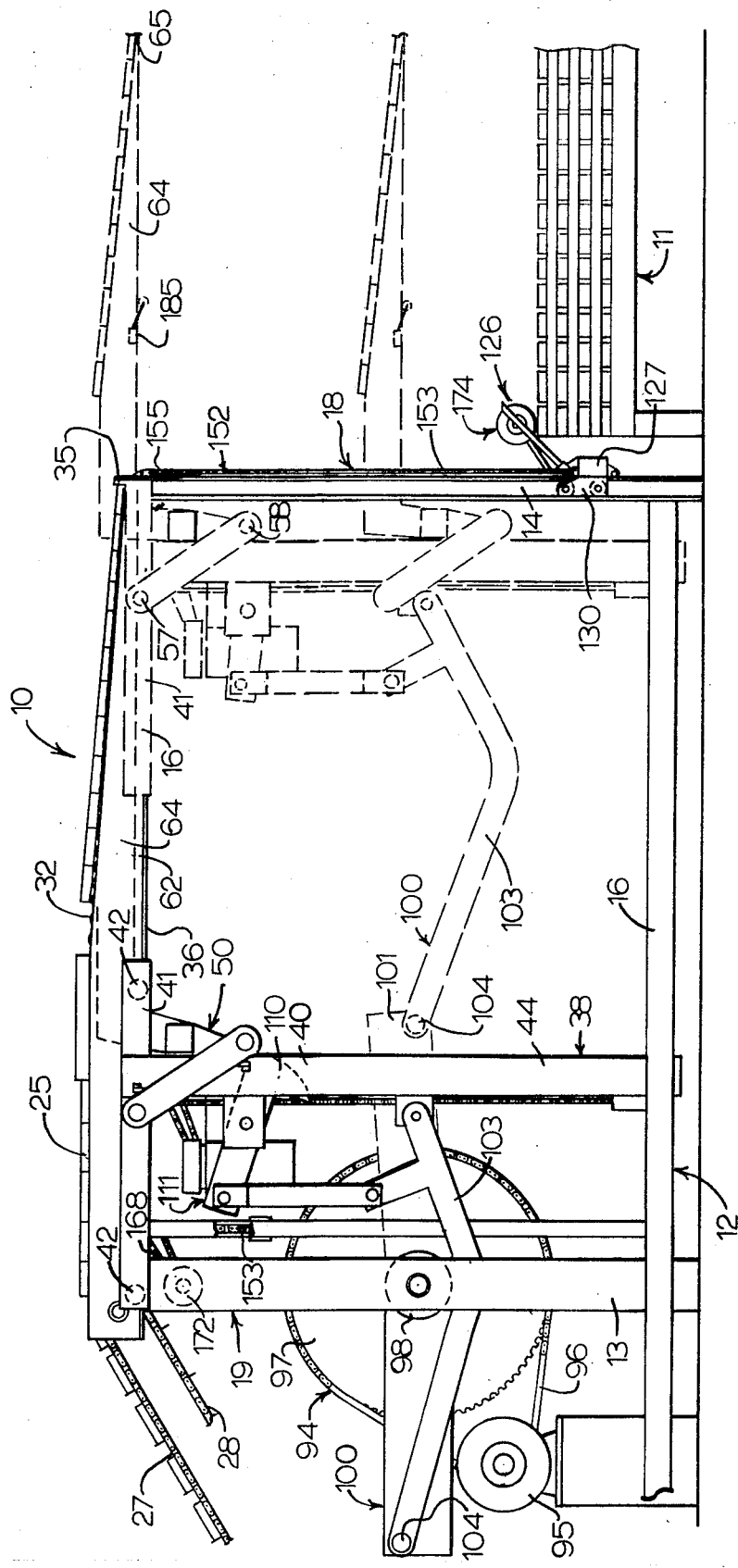
FIG. 1 is a side view of a lumber stacking apparatus with a reciprocal carriage mounted thereon for moving a forked layer support means to and from a stacking station; in which the lumber stacking apparatus incorporates the principal features of this invention with the carriage being shown in solid line at a fully retracted position and shown in dotted line in a fully extended position.

Referring now in detail to the drawings, there is illustrated in FIG. 1 a lumber stacking apparatus generally designated by the numeral 10 for sequentially placing layers of boards at a stacking station 11 one on top of each other to form a stack. The lumber stacking apparatus 10 is specifically designed to deposit the boards on the stack with the boards being horizontally spaced from each other to allow for uniform drying of the boards during a subsequent drying operation.

The lumber stacking apparatus 10 has a general framework 12 which includes rear uprights 13 and front uprights 14. The uprights are interconnected by longitudinal bracing 16 and transverse or cross-bracing 17. For purposes of illustration, the numerals 18–21 will identify the front, rear, left side and right side respectively of the lumber stacking apparatus. The uprights 14 are spaced along the front 18. The top of the framework provides a platform 25.

Individual boards are supplied one at a time to the lumber stacking apparatus from an infeed conveyor 27 having a plurality of parallel lugged chains 28. The infeed conveyor 27 feeds the boards onto a platform conveyor 30 that has an upper profile immediately above the platform 25 for receiving the boards from the infeed conveyor 27 and conveying the boards onto a plurality of inclined longitudinal rollers 32 that extend downward toward the front 18. The rollers 32 are inclined forward with ends of the rollers supported by uprights 14. The gravity rollers 32 move the boards by gravity forward toward the front of the machine. Fixed abutments or stops 35 extend upward adjacent the forward end of the gravity rollers 32 for projecting into the path of the boards on the gravity rollers to stop their forward movement and cause the boards to build up behind the stops 35 to form a course or layer.

Parallel upper-rails 36 extend longitudinally from the rear uprights 13 to the front uprights 24 on the outside of upper longitudinal bracing 16 (FIG. 9). Similar channel rails 37 are mounted along the bottom of the framework between the rear uprights 13 and the front uprights 14 on the inside of lower longitudinal bracing 16. A carriage 38 is reciprocally mounted on the lumber stacking apparatus for movement forward and back along the rails 36 and 37. The carriage 38 has a general frame 40 with transversely spaced longitudinal members 41 supporting rollers 42 which ride in the rails 36. The frame 40 has vertical members 44 that extend from the longitudinal members 41 downwardly supporting rollers 46 that ride in the rails 37. Cross braces 47 and 48 extend between the vertical members at vertically spaced positions.

The carriage 38 supports a forked layer support means generally designated with the numeral 50. The forked layer support means 50 is mounted for vertical movement on the carriage for picking up and supporting a layer of boards thereon as the carriage moves forward. The forked layer support means 50 includes a cross frame 52 having end roller frames 53 and 54 fixed thereto. Each of the roller frames 53 and 54 has a diagonal frame member 56 (FIG. 4) that extends upward and rearward with a back roller 57 affixed to the upper end and a front roller 58 fixed to the lower end for riding on respective front and rear surfaces of a vertical frame member 44. Side rollers 60 are mounted on frame member 56 for riding on the outside surface of the vertical members 44.

The forked layer support means 50 has a plurality of longitudinally extending arms 62 that are affixed to the cross frame 52 at arm bases 63. The base 63 of each arm extends upward and forward at an inclined angle with a longitudinal section 64 extending forward to an arm end 65. The longitudinal section 64 is progressively tapered having a top surface 66 and a bottom surface 68 that are extended down to a thin blade at end 65 forming a wedge shape.

The forked layer support means 50 has a drive means which includes a counterweight 70 (FIG. 4) operatively connected thereto for biasing the forked layer support means 50 to an upper position.

The counterweight 70 is vertically movably mounted in upright counterweight channels 71 and 72 which are affixed to the cross braces 47 and 48. Rollers 73 (FIG. 4) are mounted on the ends of counterweight 70 for engaging the counterweight channels 71 and 72. The drive means has flexible chains 74 operatively interconnected between the counterweight 70 and the forked layer support means 50 for biasing the forked layer support means upwardly. Each chain 74 extends over a sprocket 75 affixed on a transverse shaft 76. The shaft 76 is rotatably mounted in pillow blocks 77 affixed to the counterweight channels 71 and 72. Each chain 74 has an end 78 connected to the counterweight and an opposite end 80 that is connected to the back of the cross frame 52. Each chain end 80 operatively connected to the forked layer support means 50 through a resilient housing connectors 82 (FIG. 5) having a spring (not shown) therein. The counterweight 70 is designed in relation to the weight of the forked layer support means 50 to raise the forked layer support to the elevated position when a layer of boards is removed from the arms. The counter-weight 70 is designed to allow the forked layer support means 50 to descend when the arms are supporting a layer of boards thereon.

The forked layer support means 50 also includes brackets 84 (FIG. 4) fixed to the cross frame 52 and extending downward with cam followers or rollers 85 mounted on the ends thereof.

The lumber stacking apparatus 10 further includes an acceleration regulating means for regulating the rate of descent and ascent of the forked layer support means 50. The acceleration regulating means includes a sprocket 87 affixed to the shaft 76. The sprocket 87 is operatively connected to a motor 90 (FIG. 5) through a continuous chain 88 and a worm-gear reduction unit 91. The acceleration regulating means is designed to operate the reversible motor to cause the forked layer support means 50 to move up and down at a uniform rate. The motor 90 also acts as a brake means to stop further upward movement of the forked layer support means 50 when the layered support means reaches a desired elevation and also stops the descent of the forked layer support means 50 immediately adjacent the top of the stack. Should the layer support means 50 engage an obstacle the chain portion between the sprocket 75 and the resilient housing connector 82 will flex without breaking any of the equipment and without placing undue pressure on the obstacle.

Figure 2:
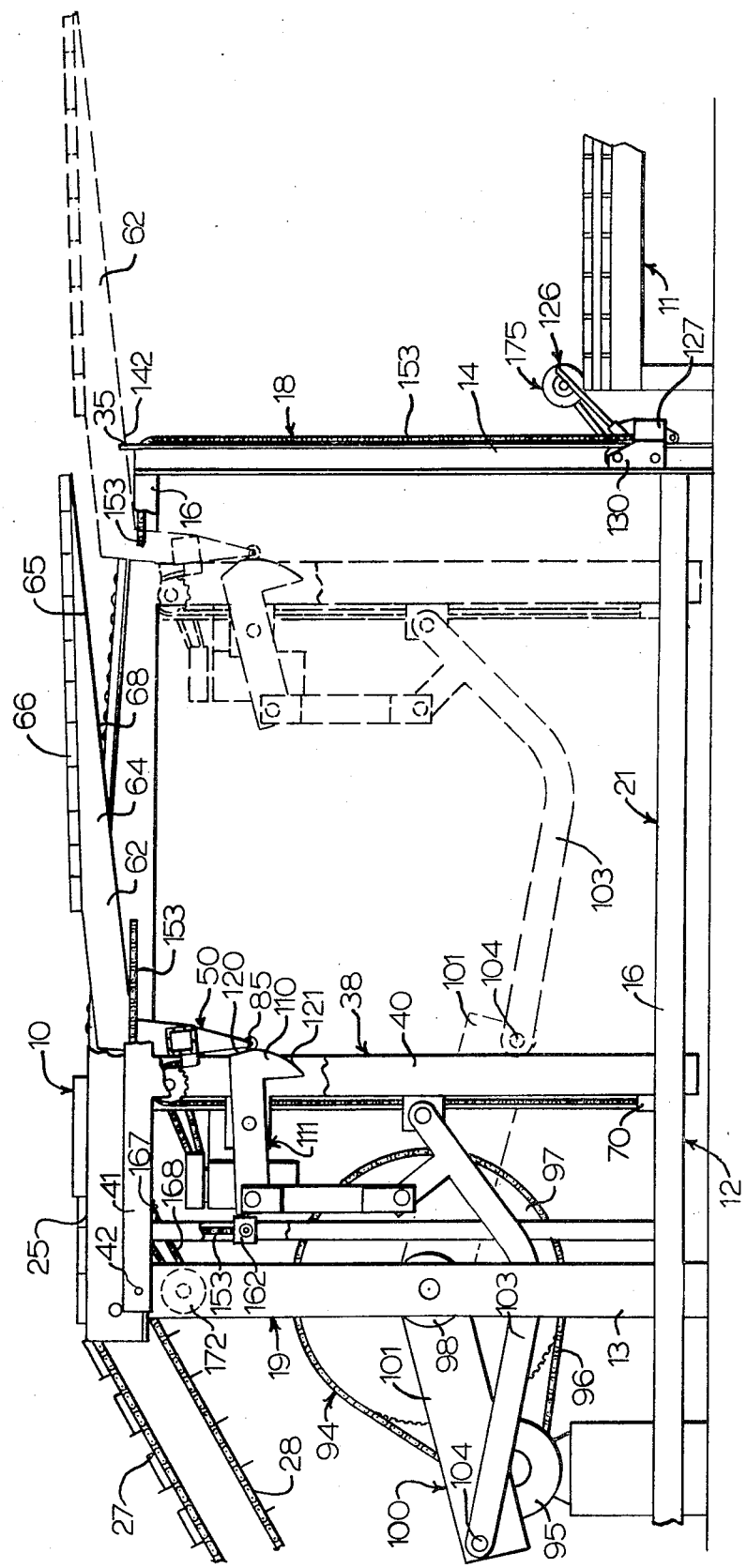
FIG. 2 is a vertical side view similar to FIG. 1 except showing the carriage during initial movement in solid line and approaching the fully extended position in dotted line.

The lumber stacking apparatus 10 includes a carriage drive 94 that is illustrated in FIGS. 1 and 2. The carriage drive 94 includes a reversible motor 95 that is connected to a sprocket 97 by way of a continuous chain 96. Sprocket 97 is affixed to a pivot shaft 98. Folding arm linkages 100 extend between the shaft 98 and the carriage for moving the carriage in response to the rotation of the shaft 98. Each folding arm linkage 100 includes an upper arm member 101 affixed to the shaft 98 that extends outwardly in a radial direction therefrom. The folding arm linkage 100 includes a forearm member 103 that is pivotally connected to the outer end of the upper arm member 101 and is also pivotally connected to the frame 40 of the carriage 38. The forearm member 103 is formed in an arcuate manner to enable the folding arm linkage 100 to pass over center in a retracted position as shown in FIG. 1. The pivotal connection between the outer end of the upper arm member 101 and forearm member 103 is referred to as the elbow pivot 104. One end of the forearm member 103 is pivotally connected to a bracket 105 (FIG. 4) affixed to the carriage frame 40 defining a pivot point 106.

Figure 4:
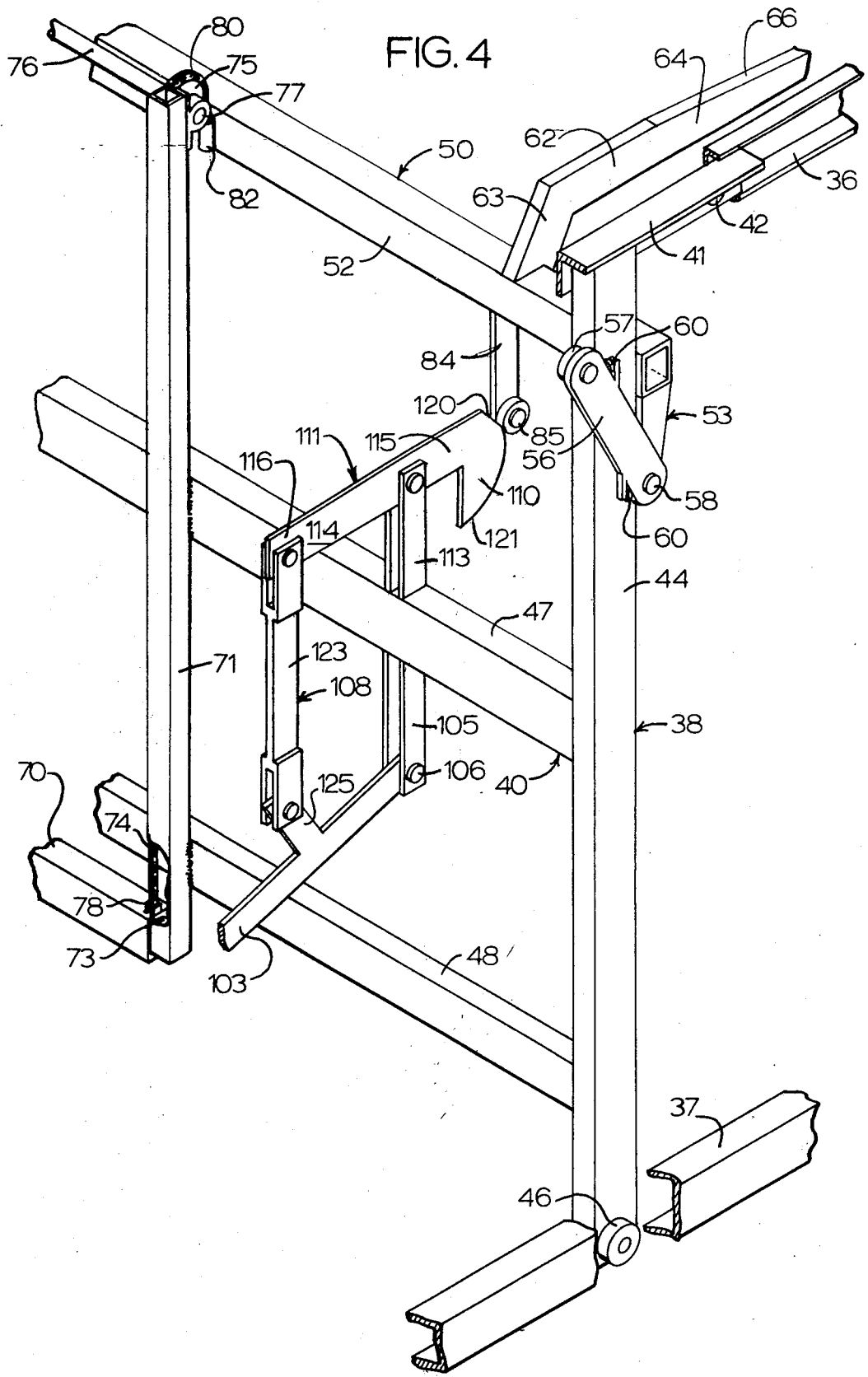
FIG. 4 is an isometric fragmentary view of a portion of the carriage structure.
Figure 5:
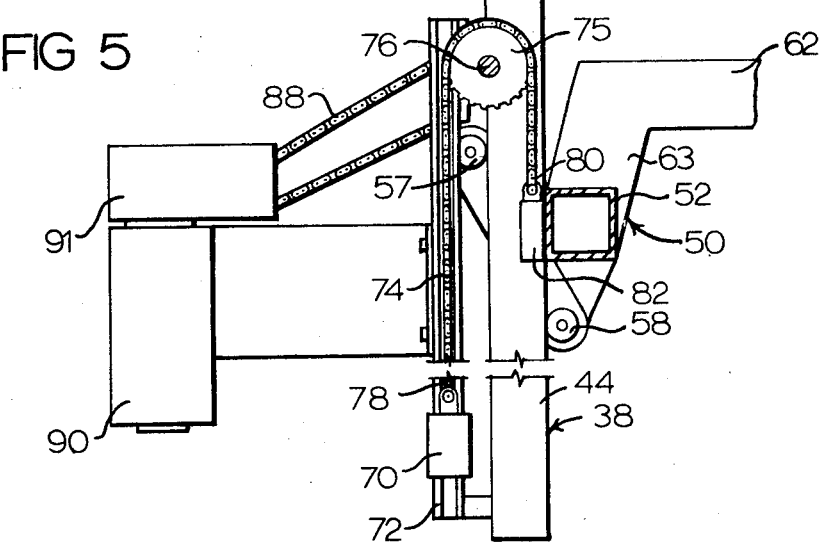
FIG. 5 is a vertical cross-sectional view taken along line 5—5 in FIG. 3.

The lumber stacking apparatus 10 also includes an arm tilting means 108 (FIG. 4) that is operatively connected to the carriage drive 94 for tilting the ends 65 of the arms 62 upward to lift a layer of boards from the gravity rollers 32 and above the stops 35 and then for tilting the arms downward when the carriage is moved to the extended position with the arms 62 extending over the stacking station. The arm tilting means 108 includes the bracket 84 and the cam roller 85. The cam follower 85 is engaged by a cam 110 that is formed on a pivot structure 111. The structure 111 (FIG. 4) is responsive to the angular movement of the forearm member 103 about the pivot point 106 for moving the cam 110 against the cam follower 85 to cause the forked layer support means 50 to pivot about the axis of the roller 57. The tilting of the arms is illustrated in FIG. 2. The pivot structure 111 includes an upstanding bracket 113 (FIG. 4) affixed to the carriage frame 40. The bracket 113 pivotally supports a pivot lever 114 that has a forward end 115 and a rear end 116. The cam 110 is formed on the forward end 115 having an inclined surface 120 and a curved surface 121 that engages the cam follower 85 as shown in FIGS. 2 and 4. The curvature of the curved surface 121 is relatively constant to maintain the arm tilted upward during the major portion of the movement of the carriage from the retracted position to the forward extended position. Inclined surface 120 breaks away from the curved surface 121 upward and rearward so that when the inclined surface 120 moves along the cam follower 85 the arms are either being swung downward or upward. A connecting arm lever 123 has one end pivotally connected to end 116 and one other end pivotally connected to a bracket 125 that is affixed on the forearm member 124 spaced from the pivot point 106. The pivot structure 111 pivots about the bracket 113 in response to the angular movement of the forearm member 103 about the pivot point 106. The angular acceleration of the forearm member 103 about the pivot point 106 varies considerably as the carriage is moved forward and back. The greatest angular acceleration occurs during the initial movement of the carriage to and from the retracted position and during the initial movement of the carriage to and from the extended position. As shown in FIG. 1 when the carriage (shown in solid lines) is in the retracted position the cam follower 85 rides on the upper portion of the inclined surface 120. As the reversible motor 95 is operated it rotates the pivot shaft 98 to pivot the upper arm member 101 from the over center position downwardly in an arc creating a rapid acceleration of the angular movement of the forearm member 103 about the pivot point 106 to pivot the pivot structure 111 to move the cam 110 to engage the cam follower 85 with the inclined surface 120 to tilt or swing the arm 62 upwardly within a very short movement forward of the carriage. As the carriage continues forward, the cam follower 85 rides on the curved surface 121 to maintain the arms tilted up. As the carriage nears the fully extended position, the forearm member 103 is again moved in a rapid angular acceleration to present the incline surface 120 to the cam roller 85 to cause the arm to swing down in front of the upright members 14. In the particular embodiment illustrated, the top surfaces 66 of the arms 62 are inclined downwardly when the arms are tilted to the down position illustrated in FIG. 1. When the arms are tilted upward (FIG. 2) the top surfaces are in a substantially horizontal plane for transporting a layer from the lumber stacking apparatus over the stacking station.

Figure 6:
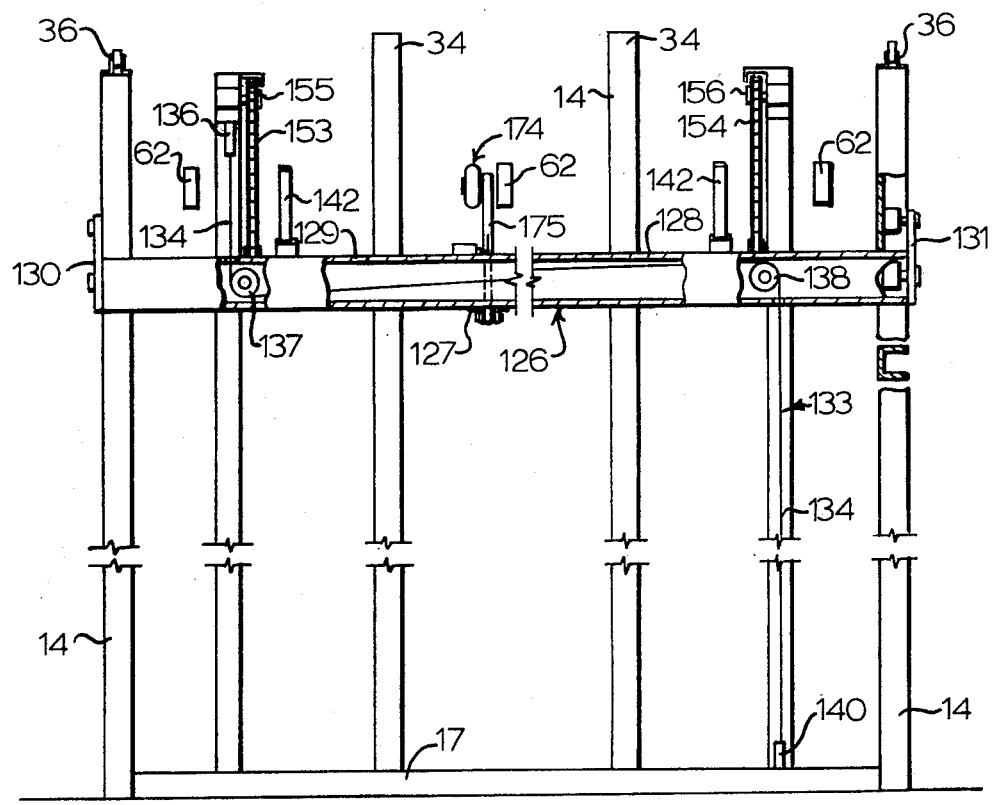
FIG. 6 is a vertical front view of the lumber stacking apparatus showing the front of the stacking apparatus with the forked layer support partly lowered in front of a stripping mechanism.

The lumber stacking apparatus 10 has a stripping means generally designated by the numeral 126 that includes a carriage 127 mounted for vertical movement immediately in front of the uprights 14. The outside front uprights 14 are constructed by channel beams to provide tracks for the carriage 127. The carriage 127 has a cross frame member 128 with roller frames 130 and 131 affixed to respective ends. Each of the roller frame members 130 and 131 have rollers thereon for rolling up and down the outside uprights 14. The stripping means 126 includes a parallel guide means 133 (FIG. 6) that maintains the cross frame 128 in a substantially horizontal orientation as it is moved up and down. The parallel guide means 133 includes a flexible cable 134 that has one end fixed to a bracket 136 at an upper end of one of the uprights 14. The cable 134 then extends downward from the bracket 136 passing under a pulley 137 mounted in the cross member 128 and then horizontally through the cross member 128 and over a pulley 138. The other end of the flexible cable 134 extends downward and is connected to a bracket 140 affixed to the lower end of the other front upright 14 as shown in FIG. 6. The parallel guide means 133 maintains the carriage 127 in a substantially horizontal condition as the carriage 127 moves up and down along the uprights 14.

The stripping means 126 includes a plurality of stripping arms 142 supported on the cross member by adjusting supports 143 (FIG. 10). The arms 142 are transversely positioned between the arms 62. The stripping arms 142 are mounted at an inclined vertical angle A (FIG. 10) to the horizontal with the arms 142 extending forward and upward from the front 18 of the machine. Each of the stripping arms 142 has an abutment surface 145 facing forward for engaging a side board of the layer on layer support means 50 to strip the layer from the arms 62 as the carriage 38 is retracted.

Specifically the lower end of the stripping arms 142 are pivotally connected to the adjusting support 143 by a bolt 147 (FIG. 10) providing a pivot point. A bolt 148 extends through the stripping arm spaced from the bolt 147 and through a curved slot 150 formed in the adjusting support 143. The angular inclination (angle A) of the arms may be varied by loosening the bolt 148 and sliding the bolt in the curved slot 150 to obtain the desired angular orientation to vary the spacing between the boards as they are stripped from the arms 62.

Figure 3:
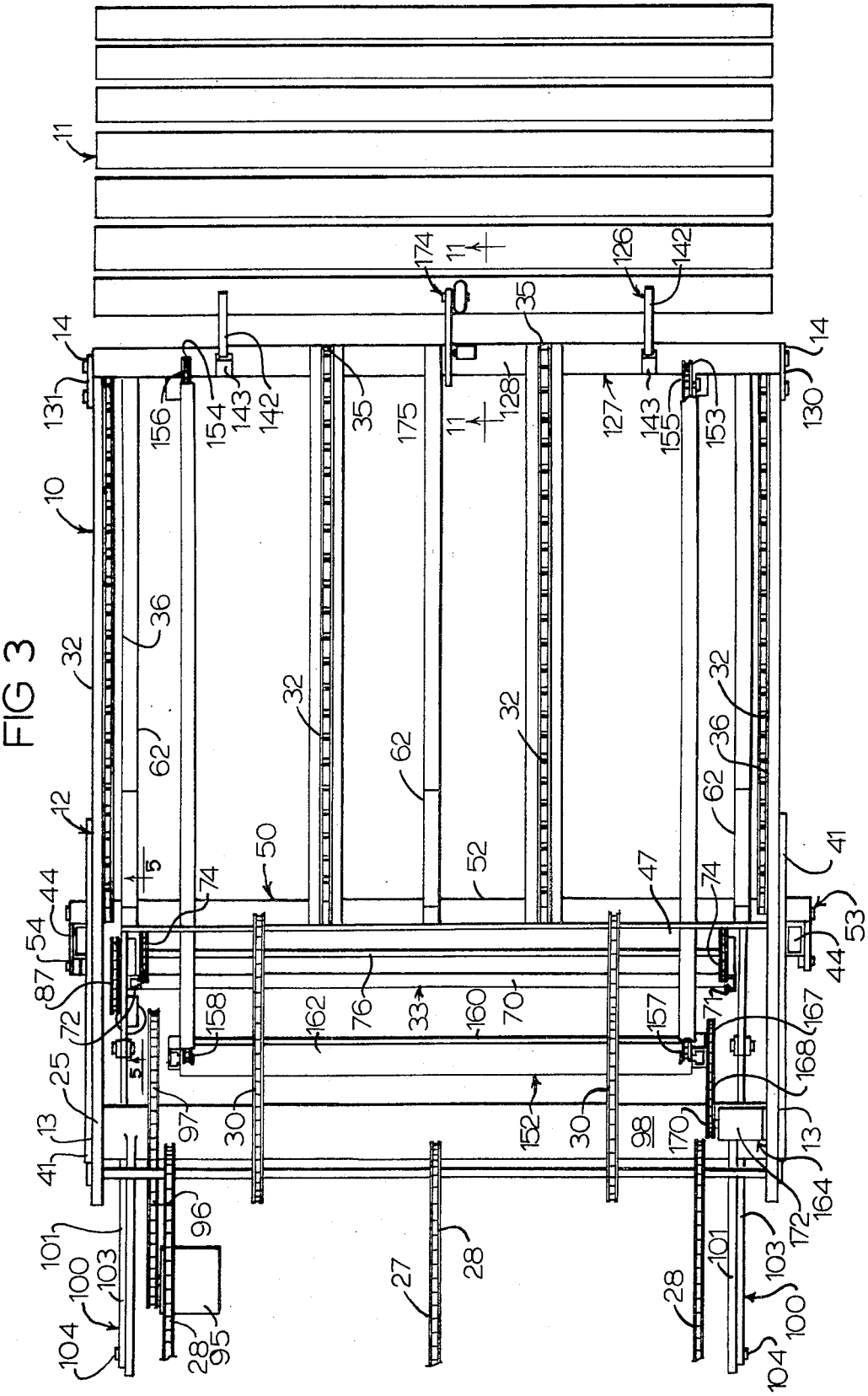
FIG. 3 is a plan view of the lumber stacking apparatus.

The stripping means 126 has a biasing means 152 for biasing the carriage 127 upward to an upward position as shown in FIGS. 1 and 2. The biasing means includes flexible chains 153 and 154 (FIG. 6) that extend upward over sprockets 155 and 156 respectively mounted on the uprights 14 and then rearward over sprockets 157 and 158 affixed on a shaft 160 near the rear of the machine (FIG. 3). Ends of the flexible chains 153 and 154 extend downward and are connected to a counterweight 162 located near the rear of the machine (FIGS. 1, 2 and 3). The other ends of the chains 153 and 154 are connected to the cross member 128. The counterweight 162 has sufficient weight to bias the carriage 127 upward. The stripping means has drive means 164 and associated control means 166 for incrementally raising the stripping arms an increment corresponding to the thickness of a layer (including sticker) of boards after each layer is placed on the stack.

The drive means 164 includes a sprocket 167 (FIG. 2 and 3) mounted on the shaft 160. A chain 168 extends from the sprocket 167 to s sprocket 170 operatively connected to the output shaft of a reversible motor 172. When the motor 172 is energized the shaft 160 is rotated to raise or lower carriage 127.

The control means 166 includes a sensing wheel assembly 174 mounted on the cross frame member 128. The sensing wheel assembly 174 has an arm 175 pivotably mounted to the bottom of the cross frame member 128 at point 176 (FIG. 11). The arm 175 extends upward behind the member 128 and then forward and upward over the stack, A wheel 177 is mounted on the forward end of arm for riding on the top layer of the stack. A feeler switch 180 is mounted on the frame 128 bearing against the arm 175. The switch 180 is operatively connected to the motor 172 to operate the motor 172 when the switch 180 is actuated.

The apparatus 10 has means for sensing the height of the stack as the arms 62 are lowered in front of the lumber stacking apparatus to operate the carriage drive 94 to retract the carriage 38 when the arms 62 are located immediately above the stack to strip the layer against the abutment surface 145 and deposit the boards at spaced intervals onto the stack. The sensing means includes a feeler switch 185 (FIGS. 1,7) mounted on the cross member 52.

During the operation of the lumber stacking apparatus 10 the boards are individually fed to the stacking apparatus by the feed conveyor 27. The platform conveyor 30 moves the boards from the rear of the machine forward onto the inclined gravity rollers 32. When the layer of boards is formed on the gravity rollers behind the abutments 34 the carriage drive 94 is operated to move the carriage forward. During the initial movement of the carriage the forked layer support means 50 is operated through the arm tilting means 108 to swing the arms 62 upward to lift the layer from the gravity rollers 32 as shown in solid line in FIG. 2. Continual operation of the drive means 94 moves the lifted layer forward positioning the layer overlying the stacking station 11 and in front of the stripping means 126. As the carriage approaches the forward or extended position the arm tilting means 108 is operated to tilt the arms downward as shown in FIG. 1 with the top surfaces 66 of the arms inclined downward and the bottom surfaces 68 substantially horizontal.

The reversible motor 90 is then operated to allow the forked layer support means 50 to descend due to its weight in combination with the weight of the layer of boards on the arms. The forked layer support means 50 moves downward to position the layer of boards in front of the abutment surface 145 immediately above the top layer of the stack, The rate of descent of the forked layer support means 50 is regulated by the speed of the motor 90 through the worm gear reduction unit 91.

When the arms 62 descend to an elevation immediately above the stack as shown in FIG. 7, the feeler switch 185 engages the top layer of the stack de-energizing the motor 90 and energizing the carriage drive 94 to retract the carriage and pull the arms 62 back past the abutment surface 145 with the top surface 66 of the arms intersecting the abutment surface 145 to strip the layer from the arms 62 and depositing the layer on the stack with the boards in the layer equally spaced form each other. As the arms 62 are retracted, the board in the layer closest to the side of the stack adjacent to the lumber stacking apparatus 10 engages the abutment surface 145. As the arms continue to be withdrawn, the intersection of the top surface 66 with the abutment surface 145 moves downwardly along the inclined abutment surface 145 as shown in FIGS. 7–9 to move the engaged side board along the abutment surface 145 toward one side of the stack to progressively shift the supported layer toward the one side as the layer is being stripped from the arms. The retraction of the arms causes the top surface 66 to move in relation to the abutment surface 145 to cause the intersection of the two surfaces 145 and 66 to move along the abutment surface 145 toward the one side.

For purposes of explanation the vertical angle between the abutment surface 145 and the horizontal is referred to as angle A. The angle between the abutment surface 145 and the top surface 66 is referred to as angle B. In this embodiment, angle B is greater than angle A to provide spaced between the boards as they are deposited onto the stack.

Angle A may be varied by adjusting the inclination of the stripping arms 142 as shown in FIG. 10. The angular adjustment provides for an adjustment in the spacing between the boards as they are deposited upon the stack.

After the arms 62 are fully retracted the motor 90 is operated to allow the counterweight 70 to raise the forked layer support means 50 to an elevated position with the layer support surface 66 immediately below the upper profile of the gravity rollers 32 in preparation to receive a succeeding layer. Stickers can be placed either mechanically or manually between each layer to vertically space the boards.

When the arm 62 begins to retract, the board closest to the uprights 14 engages the wheel 177 and pushes the wheel 177 toward the uprights 14 causing the arm 175 to pivot about point 176. As the arm 176 is pivoted, switch 180 is actuated. When the arms 62 are fully retracted, the motor 172 is energized to rotate the shaft 160 to raise the stripping assembly 127 upward while the wheel 177 maintains the engagement with the top of the stack as shown in FIG. 9. The upward movement continues until the arm 175 is pivoted back to its original position and thereby de-actuates the switch 180 which in turn stops the motor 178 (FIG. 11). In general terms the stripping assembly is indexed upward a distance corresponding to the thickness of a layer of boards plus a layer of stickers after a new layer is added to reposition the stripping arms 142 for stripping a succeeding layer from the arms 62.

It should be understood that the above described embodiment is simply illustrative of the principles of this invention and that numerous other embodiments may be readily devised without deviating therefrom. Therefore, only the following claims are intended to define this invention.

What is claimed is:

1. In a lumber stacking apparatus for successively depositing layers of boards one on top of another to form a stack, a board separating means for horizontally spacing the boards as they are deposited on the stack, comprising:

a layer support means having an inclined surface for receiving and supporting a layer thereon, in which the layer support means is horizontally movable for moving the layer support surface from a first position overlying the stack to a second position to one side of the stack;

a stripping means adjacent the one side of the stack having an inclined abutment surface angularly oriented at a vertical angle to the horizontal for projecting into the path of the layer supported on the inclined layer support surface as the layer support surface moves from the first position to the second position;

a drive means operatively connected to the layer support means for moving the layer support means in a horizontal plane from the first position to the second position to move the board supported on the layer support means closest to the one side against the inclined abutment surface to strip the layer from the inclined support surface while simultaneously progressively moving said closest board along the inclined abutment surface toward the one side as the layer is being stripped to progressively shift the layer horizontally toward the one side to space each board as each board is deposited onto the stack.

2. In a lumber stacking apparatus as defined in claim 1 wherein the vertical inclined angle of the abutment surface is adjustable to vary the horizontal spacing between the boards.

3. In the lumber stacking apparatus as defined in claim 1 wherein the layer support means includes wedge-shaped arms having an inclined top surface defining the support surface.

4. In the layer stacking apparatus as defined in claim 3 wherein the stripping means includes stripping arms positioned between the wedge-shaped arms having an inclined surface facing the stack defining the abutment surface in which the abutment surface is oriented at a vertical angle in relation to the inclined support surface that is greater than the vertical angle of the abutment surface to the horizontal.

5. In the lumber stacking apparatus as defined in claim 4 wherein the stripping means has drive means for automatically incrementally raising the abutment surface after each layer of boards is placed on the stack in preparation for stripping a succeeding layer.

6. A lumber stacking apparatus for successively depositing layers of boards one on top of another to form a stack, with boards being horizontally spaced, comprising:
- a framework adjacent a side of the stack;
- a forked layer support means having extending arms in which the forked layer support means is horizontally movably mounted on said framework for moving forward with the arms extending over the stack and for moving rearward in a horizontal plane with plane with the arms retracted, in which the arms have downwardly inclined support surfaces for receiving and supporting a layer of boards thereon;
- a power drive means operatively connected to the forked layer support means for selectively moving the forked layer support means forward and rearward over the stack;
- a stripping means mounted on a framework adjacent to one side of the stack having abutment surface spaced between the arms and projecting into the path of the layer supported on the inclined support surface as the forked layer support means is moved rearward to strip the layer off the support surface and onto the stack;
- in which the abutment surface is oriented at an inclined vertical angle in relationship to the horizontal to cause the board closest to the side of the stack to move horizontally as the layer is being stripped, to progressively shift the layer horizontally toward the one side to space the boards as the boards are deposited upon the stack.

7. A lumber stacking apparatus as defined in claim 6 wherein the stripping means includes a cross frame carrying said abutment surface that is vertically movable adjacent to one side of the stack and wherein the power drive means moves the arms over the cross frame when the forked layer support means is moved forward and wherein the forked layer support means is also mounted for moving downward when the arms are fully extended and for moving upward when the arms are fully retracted and wherein the apparatus further comprises a drive means operatively connected to the forked layer support means for moving the extended arm downward to position the supported layer immediately above the stack in front of the abutment surface and for moving the retracted arms upward to receive a succeeding layer; and
- a control means responsive to the lowering of the supported layer immediately above the stack to activate the power drive means to retract the arms rearward past the abutment surfaces to strip the layer from the arms and onto the stack.

8. A lumber stacking apparatus as defined in claim 7 further comprising:
- board stops mounted on the framework adjacent the side of the stack;
- inclined gravity rollers mounted on the framework for conveying boards by gravity toward the stops to form a layer on the framework;
- feed means for successively feeding boards onto the gravity roller; and
- means responsive to the movement of the forked layer support means for tilting the arms upward above the gravity rollers as the forked layer support means is moved forward to pick up a layer from the gravity rollers and raise the supported layer above the stops and carrying the supported layer forward over the stack and in front of the stops.

* * * * *